(12) United States Patent
Breunig et al.

(10) Patent No.: US 8,554,083 B2
(45) Date of Patent: Oct. 8, 2013

(54) METHOD FOR PRODUCING TERAHERTZ ELECTROMAGNETIC CARRIER WAVES

(75) Inventors: Ingo Breunig, Bonn (DE); Karsten Buse, Bonn (DE); Jens Kiessling, Bonn (DE); Bastian Knabe, Bonn (DE); Rosita Sowade, Bonn (DE)

(73) Assignee: Deutsche Telekom AG, Bonn (DE)

( * ) Notice: Subject to any disclaimer, the term of this patent is extended or adjusted under 35 U.S.C. 154(b) by 390 days.

(21) Appl. No.: 12/933,502

(22) PCT Filed: Oct. 29, 2008

(86) PCT No.: PCT/DE2008/001760
§ 371 (c)(1),
(2), (4) Date: Dec. 15, 2010

(87) PCT Pub. No.: WO2009/115065
PCT Pub. Date: Sep. 24, 2009

(65) Prior Publication Data
US 2011/0103801 A1 May 5, 2011

(30) Foreign Application Priority Data
Mar. 20, 2008 (DE) .......................... 10 2008 015 397

(51) Int. Cl.
*H04B 10/00* (2013.01)
*H04B 10/291* (2013.01)

(52) U.S. Cl.
CPC .................................. *H04B 10/291* (2013.01)
USPC .......................................... 398/157; 398/201

(58) Field of Classification Search
USPC ......................... 398/82, 91, 92, 201, 118, 157
See application file for complete search history.

(56) References Cited

U.S. PATENT DOCUMENTS

| | | | |
|---|---|---|---|
| 7,054,339 B1 | 5/2006 | Hu | |
| 7,339,718 B1 | 3/2008 | Vodopyanov | |
| 7,876,803 B1 * | 1/2011 | Di Teodoro et al. | 372/94 |
| 2003/0090767 A1 | 5/2003 | Yap | |
| 2003/0227668 A1 | 12/2003 | Imai | |
| 2005/0242287 A1 * | 11/2005 | Hakimi | 250/363.09 |
| 2007/0160093 A1 | 7/2007 | Nishizawa | |
| 2009/0245294 A1 * | 10/2009 | Alkulov et al. | 372/6 |
| 2012/0239013 A1 * | 9/2012 | Islam | 606/3 |

FOREIGN PATENT DOCUMENTS

WO WO 00/42468 A1 7/2000

OTHER PUBLICATIONS

Ding, Y J , *High-Power Tunable Terahertz Sources Based on Parametric Processes and Applications*, IEEE Journal of Selected Topics in Quantum Electronics, vol. 13, Nr:3, p. 705-720, May/Jun. 2007.
Czarny, R, et al., *Continuous wave THz generation based on a dual-frequency laser and a LTG—InGaAs photomixer*, Microwave Photonics, 2006. MWP '06. International Topical Meeting, p. 1-3.

(Continued)

*Primary Examiner* — Dalzid Singh
(74) *Attorney, Agent, or Firm* — Leydig, Voit & Mayer, Ltd.

(57) ABSTRACT

A method for producing an electromagnetic carrier wave in the frequency range between 0.1 and 10 terahertz that is suitable for the wireless transmission of data includes generating, by an electromagnetic pump wave, at least two mixing waves with a defined frequency difference, the pump wave being configured to constitute one of the mixing waves; and producing an electromagnetic carrier wave by frequency mixing the mixing waves.

10 Claims, 4 Drawing Sheets

(56) References Cited

OTHER PUBLICATIONS

Hache A, et al., *Quantum Interference Control of Electrical Currents in GaAs*, IEEE Journal of Quantum Electronics, vol. 34, Nr:7, Jul. 1998.

Naofumi Shimizu, et al., *CW terahertz-wave source based on photonic millimeter-wave generation and its application for spectroscopic measurement*, Infrared and Millimeter Waves, 2007 and the 2007 15th International Conference on Terahertz Electronics, p. 895-896.

Schaar, J.E., et al., *Intracavity terahertz-wave generation in a synchronously pumped optical parametric oscillator using quasi-phase-matched GaAs*, Optics Letters, vol. 32, No. 10, p. 1284-1286, 2007.

Masayoshi Tonouchi, *Cutting-edge terahertz technology*, Nature Photonics, vol. 1, p. 97-106, 2007.

Search Report for International Application No. PCT/DE2008/001760, mailed on Apr. 14, 2009.

\* cited by examiner

METHOD FOR PRODUCING TERAHERTZ ELECTROMAGNETIC CARRIER WAVES

CROSS-REFERENCE TO RELATED APPLICATIONS

This application is a U.S. National Phase application under 35 U.S.C. §371 of International Application No. PCT/DE2008/001760, filed on Oct. 29, 2008, and which claims benefit to German Patent Application No. 10 2008 015 397.4 filed on Mar. 20, 2008. The International Application was published in German on Sep. 24, 2009 as WO 2009/115065 A1 under PCT Article 21(2).

FIELD

The invention concerns a method for producing an electromagnetic carrier wave in the frequency range between 0.1 and 10 terahertz that is suitable for the wireless transmission of data. The invention also concerns a system for implementing the method.

BACKGROUND

Since the time approximately 100 years ago when first technologies for wireless data transmission began to be employed, the bandwidth available for transmission has grown continuously. As is known, the width of the frequency band that can be used for transmission depends on the carrier frequency, so that as the frequency increases, the transmission bandwidths available also increase. Nowadays, carrier frequencies in the range from a few kilohertz to many gigahertz are used. Thus, so-called "wireless HD" operates with a carrier frequency of 60 GHz and bandwidths of 4 Gbit/s. In order to be able to achieve data rates in the range of 10 Gbit/s and higher, waves in the terahertz range will also be used as carriers in the future.

Such terahertz waves are generated by means of ultrafast electronic circuits or by means of optical methods. Since the electronic methods are limited in their speed on account of the lifetimes of free electrons and holes, these methods operate only inefficiently, if at all, at frequencies above 100 GHz. In contrast, the prior art optical methods for generating terahertz waves mostly employ high frequencies that are then reduced by frequency mixing.

For data transmission with terahertz waves, it is virtually essential that the carrier frequency can be reproduced with great accuracy. In this way, the receiver can produce a carrier wave of the same frequency that is then used for demodulating the incident wave. Uncontrollable variations over time in the fundamental frequency of the carrier wave hinder data transmission, since the receiver must dynamically adjust itself to the particular emission frequency.

SUMMARY

In an embodiment, the invention provides a method for producing an electromagnetic carrier wave in the frequency range between 0.1 and 10 terahertz that is suitable for the wireless transmission of data. The method includes generating, by an electromagnetic pump wave, at least two mixing waves with a defined frequency difference, the pump wave being configured to constitute one of the mixing waves; and producing an electromagnetic carrier wave by frequency mixing the mixing waves.

BRIEF DESCRIPTION OF THE DRAWINGS

Additional advantages, special features and practical refinements of the invention ensue from the embodiment examples below explained on the basis of figures. The figures show the following.

DETAILED DESCRIPTION

Figure 1:
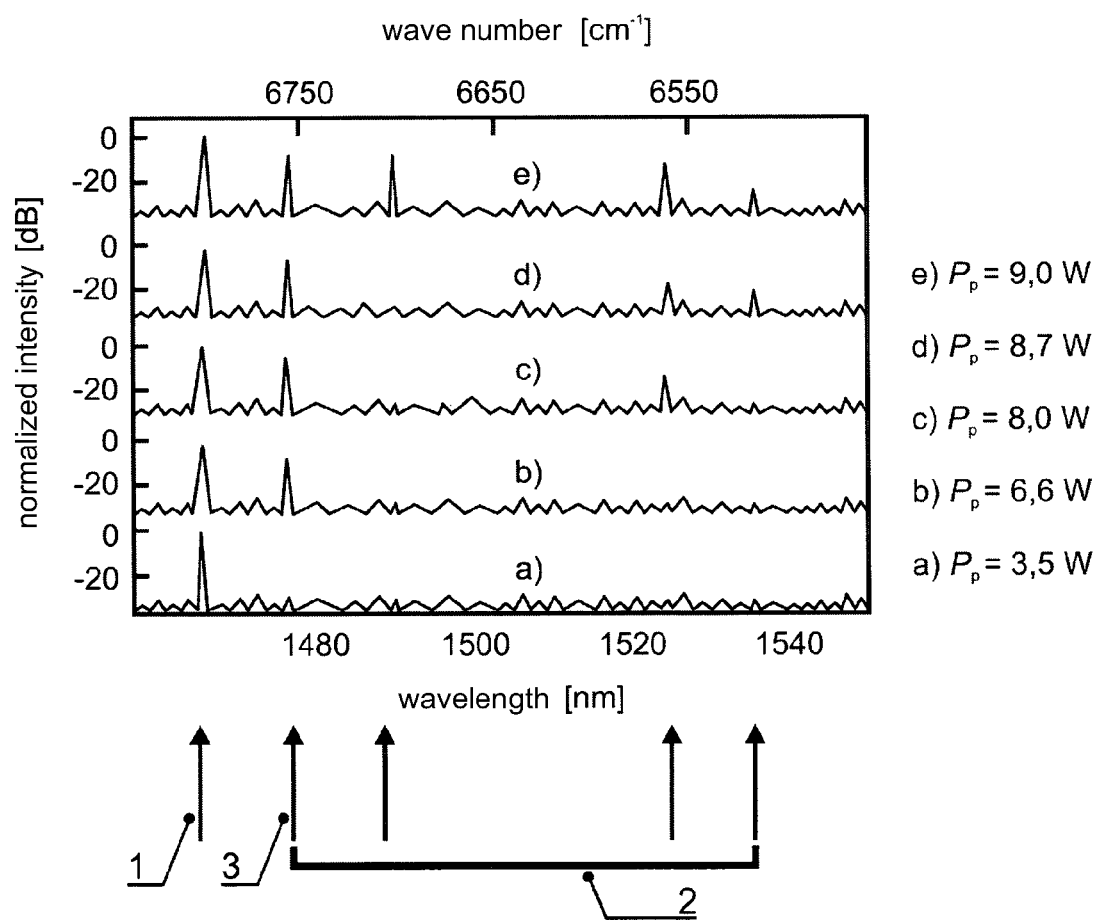
FIG. 1 is a depiction of measured Raman spectra according to embodiments of the invention.

Embodiments of the invention provide a method with which terahertz waves having high frequency stability and good reproducibility can be produced in a simple and economical way. Additional embodiments of the invention create a system for implementing the method.

One embodiment of the invention creates a transmitter for terahertz waves that provides one or more channels for information transmission as follows: Starting from a first electromagnetic optical wave, hereinafter called a "pump wave," a second optical wave is generated using a physical effect or by means of a special experimental setup, wherein the physical effect or the experimental setup employs frequencies that can be generated with the pump wave and requires no "extrinsic frequencies" in the terahertz range to be determined externally, so that the difference in the frequencies of the first and second optical waves is fixed. By means of the presence in the reference system of a single frequency determined by the pump frequency, especially great reproducibility of the carrier frequency can be achieved, since variations in the frequency of the first optical wave transmit themselves equally to the frequency of the second optical wave; however, the difference frequency remains stable. At least two "mixing waves" with a defined frequency difference, which are to be used for a later frequency mixing, are thus produced by the physical process or the experimental setup, wherein the pump wave itself may constitute one of the mixing waves. Alternatively, the pump wave can also generate multiple optical waves with fixed frequency spacings, with these generated waves subsequently being mixed to generate a wave at the difference frequency. Because of the common origin, the pump wave, these two mixing waves also have a fixed frequency relationship to one another.

In the subsequent process, the two mixing waves are combined with one another in accordance with embodiments of the invention, wherein a mixing frequency that is usable for the carrier wave is produced by frequency mixing. In this context, the process of frequency mixing is quite well known. So that a carrier wave in the frequency range between 0.1 and 10 terahertz results from this process, mixing waves of appropriate output frequencies should be produced as a starting point. The generation of the mixing waves ensures that the mixing frequency can be generated in a reproducible manner, and is subject to low variations over time.

Visible light at a frequency of approximately $\omega_{visible} \approx 6 \times 10^{14}$ Hz=600 THz presents itself as a pump wave. In order to produce a terahertz wave of well defined frequency, particularly with frequency variations that remain within a channel spacing of approximately 10 MHz, in the case of difference frequency mixing of independent waves of frequencies $\omega_{visible,1}$ and $\omega_{visible,2}$, their frequencies would have to be set with an absolute accuracy of better than 10 MHz/600 THz$\approx 10^{-8}$. This would require nearly impossible effort. With the method according to the invention, which employs two waves that are, in a sense, "frequency coupled," such accuracy is readily achievable.

According to embodiments of the invention, first a coherent pump wave of the frequency $\omega_{visible,1}$ is generated. With the aid of a conversion process, this wave is then partially converted into a mixing wave of the frequency $\omega_{visible,2}$, wherein the converter used employs a physical process or an experimental setup that, as described above, determines a fixed frequency offset. Raman scattering in particular can be an example of such a process.

Some embodiments provide, firstly, that the absolute frequency $\omega_{visible,1}$ of the pump radiation, and the variations of this pump frequency, are not critical to the resulting frequency of the terahertz wave. Thus, terahertz waves of equal frequency can be generated independently of one another in extremely different devices using this method, especially in transmitters and receivers. A further aspect is that the frequency of the generated terahertz carrier wave does not significantly change with time, as would be the case if it were generated by means of two independent laser sources. This has the great advantage that the receiver can tune itself to one frequency in a fixed manner and need not dynamically follow variations in the frequency of the terahertz carrier wave. Naturally, it is possible using known methods to modulate information onto the inventively generated terahertz carrier waves, making it possible to transmit data. Examples are amplitude, frequency, phase, and polarization modulation.

Finally, it should be mentioned that embodiments of the invention make it possible to carry out standardizations for the terahertz range in which such well-defined terahertz frequencies are determined that can be reproducibly achieved through physical processes and/or optical setups.

The Method According to Embodiments of the Invention is Explained Below with Reference to FIGS. 1 through 4

FIG. 1 shows measured Raman spectra of lithium niobate crystals, such as are also similarly known from the literature. In this regard, the irradiation of the crystal with a pump wave 1 at frequency $\omega_{visible,1}$ in the visible range results in partial conversion of the pump wave 1 into waves of other frequencies, namely the Raman lines 2. These can be used as mixing waves together with the pump wave. The frequency shift of the Raman effect results from the fact that the photons of the pump wave 1 absorb or donate energy from lattice vibrations of the crystal (phonons). Like an internal oscillator, these lattice vibrations have a precise frequency. The spectra shown in FIG. 1 provide several options for generating suitable waves with frequencies $\omega_{visible,2}$, so that the difference frequency $\omega_{visible,2} - \omega_{visible,1}$ lies in the terahertz range. It is generally unimportant whether the Stokes line or the anti-Stokes line of the Raman scattering is used as the mixing wave here.

By way of example, the difference frequency between the fundamental pump wave 1 and the first Raman line 3, at about 1.2 THz, is drawn in. The spectrum shown was created with a periodically polarized lithium niobate crystal in an optical parametric oscillator. The crystal temperature was T=65° C., and the period length of the crystal structure was $\Lambda$=29.5 µm. For the spectra a)-e), the pump power of the optical parametric oscillator was raised, so that the power of the pump wave also increased. An increasing number of Raman lines 2 become evident with increasing power.

It is noteworthy that the Raman lines 2 can have similar intensity to that of the remaining pump wave 1. With Raman lines of such intensity, the actual terahertz wave can be generated in a nonlinear optical element by difference frequency generation from two such mixing waves. If the waves with frequencies $\omega_{visible,2}$ and $\omega_{visible,1}$ are present with comparable power, it is possible to do this with high efficiency.

Figure 2:
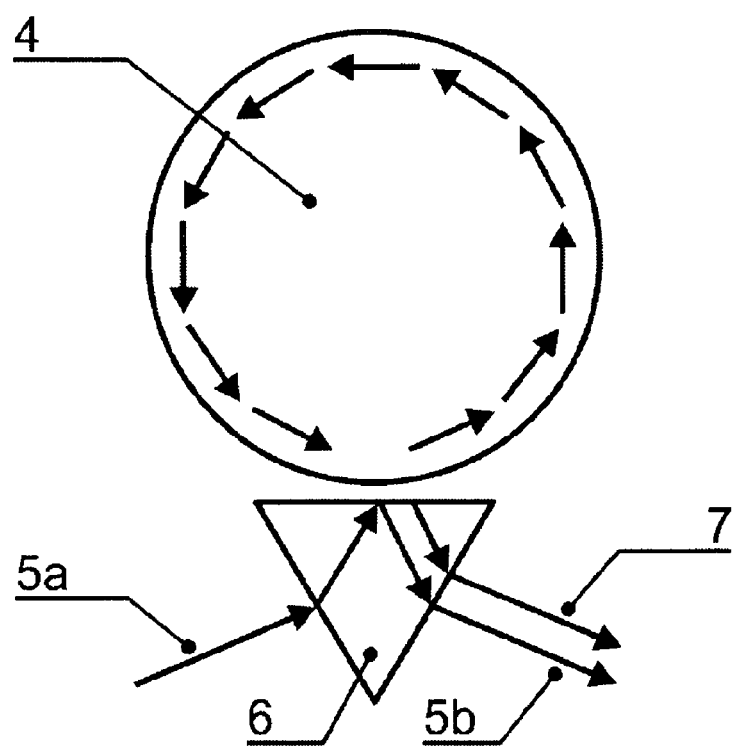
FIG. 2 illustrates an embodiment of the invention having an arrangement with whispering-gallery-mode resonator.

Since the Raman effect arises only at high optical power levels, the nonlinear material that exhibits the Raman effect is advantageously placed in a resonator in order to increase the intensity of the light. This can be an optical parametric oscillator. Other resonators without optical parametric processes are also suitable; a high "fineness" of the resonator, which is a measure of the enhancement of the light intensity, is to be preferred here. The whispering-gallery-mode resonators 4 shown in FIG. 2 are especially advantageous. These are composed of circular disks in which the light is held trapped due to total internal reflection. Thus, a pump wave 5a can be coupled with the aid of a prism 6 into the whispering-gallery-mode resonator 4, in which an additional Raman-shifted line 7 arises in addition to the pump wave 5b due to the Raman process. Using the prism 6, the Raman shifted line 7 can be coupled out along with a portion of the pump wave 5b. The generation of the actual terahertz radiation takes place thereafter with a separate nonlinear element as described above. For example, nonlinear optical crystals and photo mixers can be used for this purpose.

Whispering-gallery-mode resonators can be compact in their implementation. The high fineness of these resonators has the consequence that even at a few milliwatts of pump power, several watts of light can oscillate in the resonators, which is sufficient to produce Raman effects. In this way, several kilowatts of optical power can be achieved in the resonators with laser diodes of one watt output power. Such a setup is thus particularly suited to being operated with laser diodes. Laser diodes with individual emitters that generate light at wavelengths of 808 nm, 880 nm, and 976 nm are obtainable in this power class.

In an advantageous arrangement, the element for difference frequency mixing can be integrated into the resonator, with the element then generating the actual terahertz carrier wave from the mixing waves 7 and 5b. This eliminates the need to couple light other than the terahertz wave out of the resonator. To this end, constructing the resonator, e.g., from a nonlinear optical crystal such as lithium niobate suggests itself. FIG. 2 shows some Raman lines from this material, which in addition exhibits what is called $\chi^{(2)}$ nonlinearity and could be used to simultaneously generate the desired terahertz wave in the resonator by mixing the waves 7 and 5b. A phase matching is required for this purpose. This can be accomplished here through periodic poling of the crystal, which is referred to as quasi-phase matching.

Figure 3:
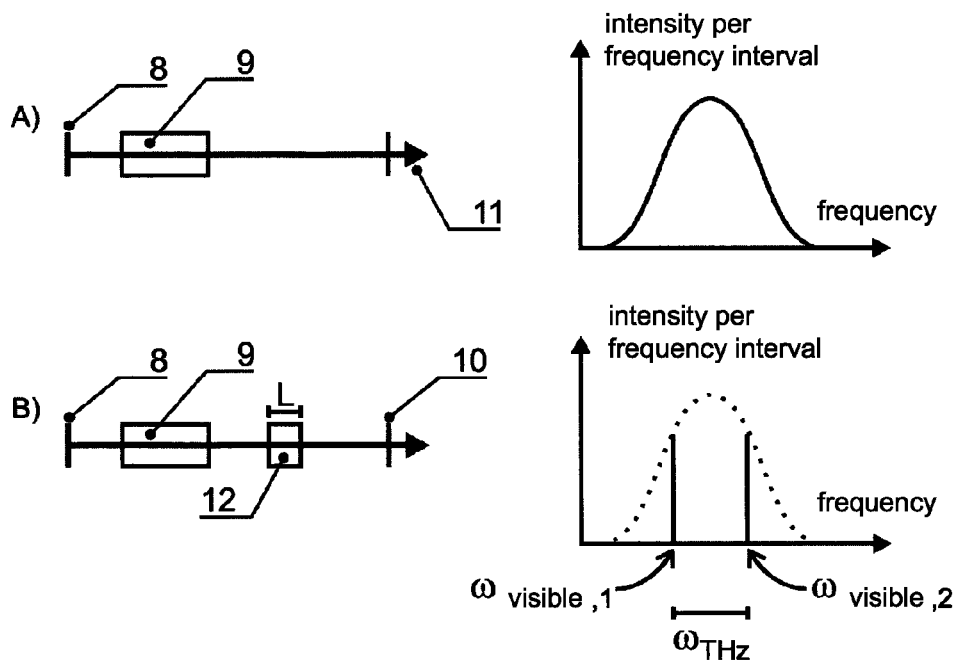
FIG. 3 illustrates embodiments of the invention including two arrangements with lasers.

Also suitable for implementing the inventive method are optical arrangements that, in a well-defined manner, generate two waves at frequencies $\omega_{visible,1}$ and $\omega_{visible,2}$ in the infrared, visible, or ultraviolet spectral range, whose difference frequency lies in the terahertz range. FIG. 3 shows one example of such an arrangement; this is a laser process that exhibits a broad emission spectrum (right side of FIG. 3A). Such a laser has a rear mirror 8, a laser-active medium 9, and an output coupling mirror 10. Here, one end of the laser-active medium 9 can also constitute the rear mirror 8 as a result of Fresnel reflectivity or an additional coating. The spectral bandwidth of the laser beam 11 covers more than one nanometer.

If an additional resonator 12 of length L is introduced into this laser (FIG. 3B), then only light waves that are also resonant for this resonator can begin to oscillate. If the material of which the resonator is made has a refractive index n, then the frequency spacing of the longitudinal modes of the short resonator is $\Delta\omega=\pi c_0/(Ln^2)$, where $c_0$ represents the speed of light in a vacuum. In order to reach $\Delta\omega/2\pi=1$ THz, an L of approximately 0.42 mm is required for n=1.5 (glass). Fine tuning of the resonator length can be undertaken by means of temperature for resonators of glass or other dielectric materials, for example, since both L and n depend on temperature. In this way, defined lines $\omega_{visible,1}$ and $\omega_{visible,2}$ with stable frequency difference $\omega_{THz}$ are cut out of the broad frequency spectrum, and are used according to embodiments of the invention as mixing waves in order to generate a terahertz carrier frequency by frequency mixing.

It is advantageous for the emission spectrum of the laser without resonator (FIG. 3A) to be approximately twice as wide as the mode spacing $\Delta\omega$. The thickness of the resonator, which can be controlled with high accuracy and reproducibility, defines the difference frequency $\Delta\omega$ in a fixed manner. As a result of the above-mentioned temperature dependence of L and n, small temperature changes in the resonator can also ensure that two modes that are located symmetrically with respect to the maximum of the amplification begin to oscillate, as is schematically indicated by the spectrum in FIG. 3B.

If the laser-active material is, for example, a semiconductor that emits light at a wavelength of 800 nm, then more than 1500 waves fit in the resonator in the numerical example mentioned above. This means that a temperature-induced change in the relative length of less than 0.001 is sufficient to cause the two modes to start oscillating optimally. In spite of this, the terahertz difference frequency can be established with an accuracy of at least 0.1%. Ultimately, if the two desired waves are present, the terahertz wave can then once again be produced from the two generated waves with the aid of a nonlinear optical element.

Figure 4:
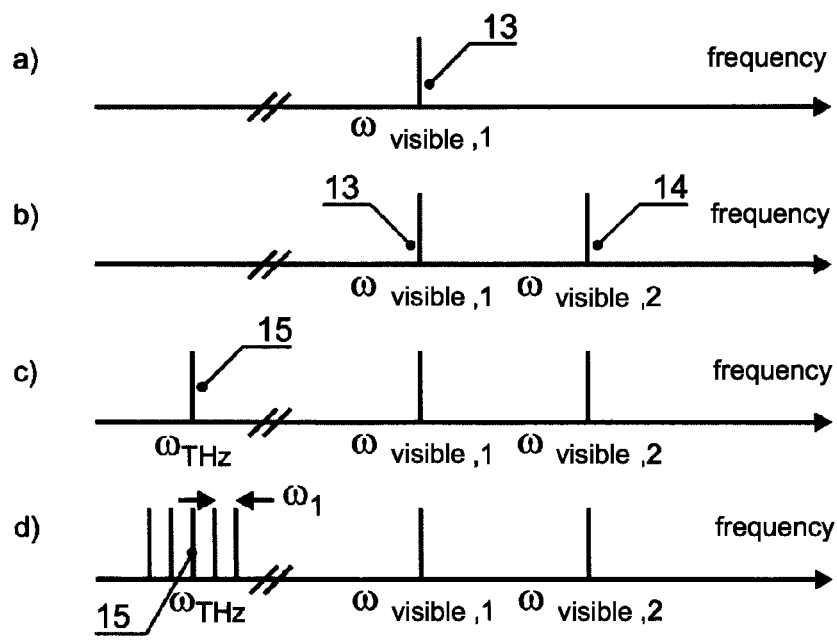
FIG. 4 illustrates distributions of spectral lines according to embodiments of the invention.
Figure 5:
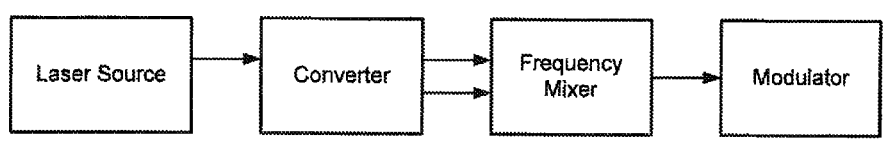
FIG. 5 illustrates a laser source, converter, frequency mixer, and modulator according to an embodiment of the invention.
Figure 6:
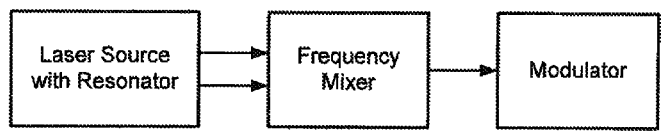
FIG. 6 illustrates a laser source equipped with a resonator, frequency mixer, and modulator according to an embodiment of the invention.

FIG. 4 summarizes the processes once more: In the first step a), pump light 13 at frequency $\omega_{visible,1}$ is generated, with no special requirements being placed on the accuracy of the frequency, so that even high-power laser diodes can be considered as sources. In step b), a portion of the pump light 13 is changed in frequency in a well-defined manner with the aid of a converter, which can be a physical process or an experimental setup, so that an additional mixing wave 14 at frequency $\omega_{visible,2}$ results in addition to the mixing wave formed by the pump light. The Raman effect can be a suitable process in this regard.

Alternatively, as described above, the mixing waves 13 and 14 of well-defined frequency can be produced with a laser emitting two waves at different frequencies, so that it is possible to begin with step b). The laser equipped with a resonator serves as converter here.

In the next step c), with the aid of a frequency mixer, which in particular brings about a difference frequency mixing, the desired terahertz light 15 at frequency $\omega_{THz}$, which can serve as a carrier wave, is generated. Lastly, in step d) the carrier wave is passed through a modulator, which could generate sidebands 16 at a frequency spacing of $\omega_1$, but which serves primarily to impress information on the carrier wave 15.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for producing an electromagnetic carrier wave in a frequency range between 0.1 and 10 terahertz that is suitable for wireless transmission of data, the method comprising:
   generating a pump wave, wherein the pump wave is a first mixing wave;
   generating a second mixing wave based on the pump wave via a converter, wherein the second mixing wave and the first mixing wave have a defined frequency difference;
   producing a carrier wave by frequency mixing the first and second mixing waves; and
   modulating the carrier wave with data to be transmitted.

2. The method of claim 1 wherein a frequency of the pump wave is in approximately a frequency range of visible light.

3. The method of claim 1 wherein generating the second mixing waves comprises using a nonlinear optical generation process excited by the pump wave.

4. The method of claim 3 wherein the nonlinear optical generation process includes a Raman scattering taking place within a nonlinear medium, wherein a Raman line is used as the second mixing wave, the second mixing wave being reproducibly shifted in frequency.

5. The method of claim 1 wherein the frequency mixing includes difference frequency mixing.

6. A system for producing an electromagnetic carrier wave that is suitable for the wireless transmission of data, the system comprising:
- a laser source configured to generate a pump wave, wherein the pump wave is a first mixing wave;
- a converter configured to generate a second mixing wave from the pump wave, wherein the second mixing wave and the first mixing wave have a defined frequency difference;
- a frequency mixer configured to mix the first and second mixing waves into a carrier wave in a frequency range between 0.1 and 10 Terahertz; and
- a modulator configured to modulate the carrier wave with data to be transmitted.

7. The system of claim 6, wherein the laser source is configured to generate laser light with a frequency in or near a visible range.

8. The system of claim 6, wherein the converter includes a nonlinear optical crystal configured to generate, by the pump wave, Raman scattering.

9. A method for producing an electromagnetic carrier wave in a frequency range between 0.1 and 10 terahertz that is suitable for wireless transmission of data, the method comprising:

generating, by a laser source, a first mixing wave and a second mixing wave, wherein the second mixing wave and the first mixing wave have a defined frequency difference and the second mixing wave is generated by the laser source together with a resonator;

producing a carrier wave by frequency mixing the first and second mixing waves; and modulating the carrier wave with data to be transmitted.

10. A system for producing an electromagnetic carrier wave that is suitable for the wireless transmission of data, the system comprising;
- a laser source configured to generate a pump wave, wherein the pump wave is a first mixing wave;
- a resonator, wherein the laser source is configured to utilize the resonator to further generate a second mixing wave, wherein the second mixing wave and the first mixing wave have a defined frequency difference;
- a frequency mixer configured to mix the first and second mixing waves into a carrier wave in a frequency range between 0.1 and 10 Terahertz; and
- a modulator configured to modulate the carrier wave with data to be transmitted.

* * * * *